United States Patent [19]

Watanabe

[11] Patent Number: 4,681,452
[45] Date of Patent: Jul. 21, 1987

[54] CONTROL SYSTEM FOR AUTOMATIC ELECTRONIC-PART MOUNTER

[75] Inventor: Kenichi Watanabe, Chiba, Japan

[73] Assignees: Hitachi, Ltd., Tokyo; Hitachi Keiyo Engineering Co., Ltd., Narashino, both of Japan

[21] Appl. No.: 794,379

[22] Filed: Nov. 4, 1985

[30] Foreign Application Priority Data

Nov. 5, 1984 [JP] Japan ................... 59-231287

[51] Int. Cl.$^4$ ..................... G01B 11/14; G06F 15/46
[52] U.S. Cl. ..................... 356/375; 364/468
[58] Field of Search ............ 356/375, 400; 250/561; 318/640; 364/550, 551, 559, 561, 571, 468

[56] References Cited

U.S. PATENT DOCUMENTS

| | | | |
|---|---|---|---|
| 4,286,201 | 8/1981 | Roecks et al. | 250/561 X |
| 4,566,071 | 1/1986 | Takahashi | 364/468 |

FOREIGN PATENT DOCUMENTS

| | | | |
|---|---|---|---|
| 0134303 | 10/1980 | Japan | 356/375 |
| 0012303 | 1/1982 | Japan | 356/375 |
| 0033103 | 2/1983 | Japan | 356/375 |
| 2070234 | 9/1981 | United Kingdom | 356/375 |
| 2104649 | 3/1983 | United Kingdom | 250/561 |

Primary Examiner—Eugene R. LaRoche
Assistant Examiner—David Mis
Attorney, Agent, or Firm—Fay, Sharpe, Beall, Fagan, Minnich & McKee

[57] ABSTRACT

The position of a part-mounting section on a circuit board may be displaced from a reference point. It is therefore necessary to detect the actual position of each part-mounting section before an electronic part is mounted on it. Each circuit board has a plurality of part-mounting sections located in close proximity to each other. The positions of a predetermined number of the part-mounting sections are collectively detected continuously, followed by mounting the electronic parts on the part-mounting sections, thereby shortening the time required of the mounting work.

24 Claims, 12 Drawing Figures

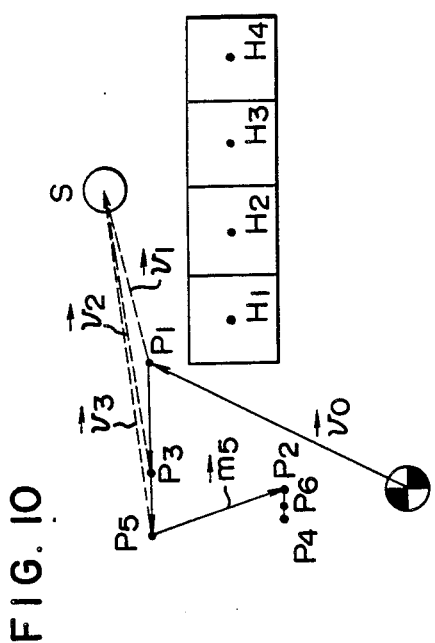
FIG. 10
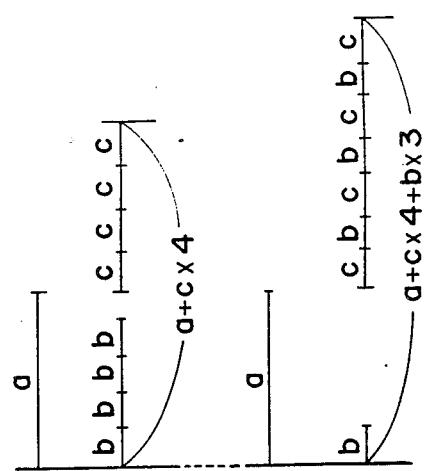
FIG. 11A
FIG. 11B
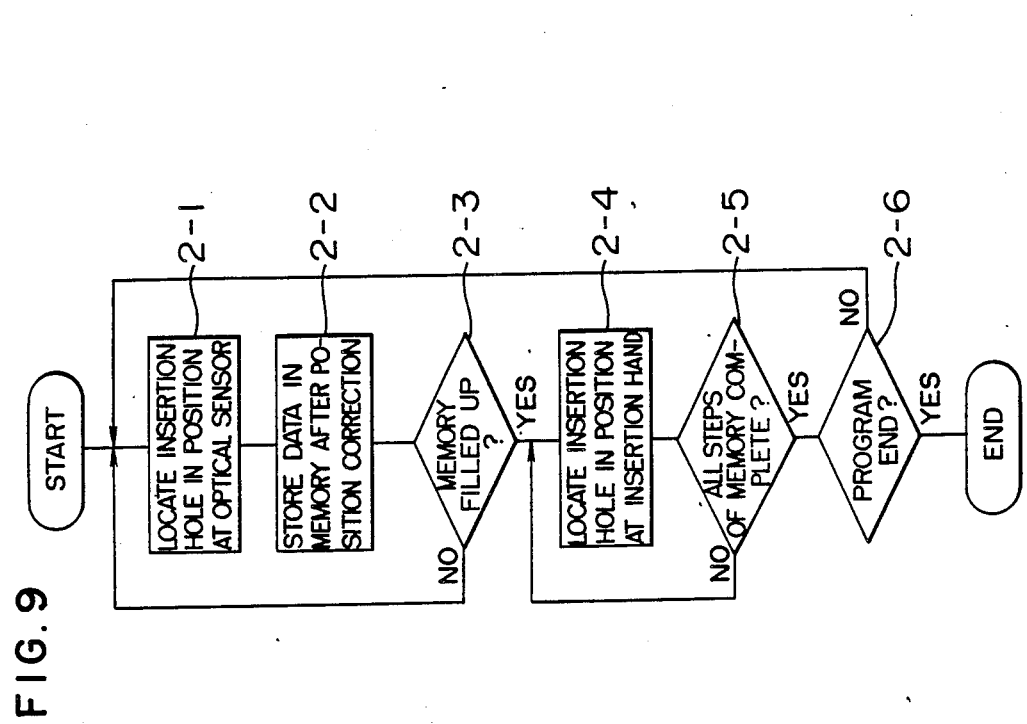
FIG. 9

CONTROL SYSTEM FOR AUTOMATIC ELECTRONIC-PART MOUNTER

BACKGROUND OF THE INVENTION

The present invention relates to an automatic mounter for mounting electronic circuit parts on a circuit board, or more in particular to an automatic electronic-part mounter equipped with the function to correct the position of a part-mounting section of the circuit board.

In preparing a circuit board, a part is inserted in a board formed with a circuit pattern and holes for inserting terminals of the part, and they are soldered. Among these processes, an automatic electronic-part mounter explained below has been used to insert the part. Such an automatic electronic-part mounter comprises a movable table for placing a board thereon, a hand unit for holding an electronic part, and a part supply unit for supplying an electronic part.

The movable handle is movable as desired along the X and Y coordinate system, and carries a circuit board thereon to place the same in position.

The hand unit includes four hands movable between the supply unit and a predetermined position on the movable table to transport a predetermined electronic part from the part supply unit to a part-mounting section on the circuit board placed on the surface of the movable table and to mount the part on the part-mounting section.

Since there is an error both in the position of each part-mounting section of the circuit board and in the position of the circuit board on the movable table, an attempt to mount an electronic part directly at the part-mounting section may not succeed.

In a conventional method of correcting such a problem, the actual position of each part-mounting section is confirmed by sensor and the positional data is corrected before moving the movable table in order to mount an electronic part accurately in position despite "of" any displacement. In the case where holes for inserting leads of an electronic part are formed in the part-mounting section of the circuit board, the position of the part-mounting section may be confirmed by such insertion holes. A sensor suitable for such a purpose is of optical type including a projector for projecting light toward the circuit board and a photo-detector for receiving the light passed through a predetermined insertion hole of the circuit board. In the positioning process, the movable table is moved if the center of an insertion hole fails to coincide with the optical axis of the sensor, and when they come to coincide with each other, the prevailing position of the movable table is stored in a buffer memory of a control unit. In the subsequent processes of inserting a lead into this insertion hole, the stored positional data is used to move the movable table, thereby positioning the movable table accurately.

The operation of such a conventional automatic electronic-part mounter is shown in the flowchart of FIG. 1. First, as shown in step 1-1 the movable table is moved to determine the provisional position of an insertion hole against the sensor. At the next step 1-2, the displacement of the insertion hole is detected, followed by step 1-3 where the position of the insertion hole against the hand that has grabbed an electronic part in advance is determined by use of the result of detection of the displacement. Then the lead of the electronic part is inserted into the insertion hole. This operation is repeated for each insertion hole.

FIG. 2 shows relative positions of the circuit board, the sensor and the hand in the above-mentioned case. In FIG. 2, reference character B designates the circuit board, character O an origin assumed to exist on the circuit board by way of explanation, characters $h_1$ to $h_3$ insertion holes, $H_1$ to $H_4$ four hands used for insertion, S the sensor, $v_1$ to $v_3$ vectors representing the positional relations between each of the insertion holes $h_1$ to $h_3$ and the origin O, character $v_O$ a vector representing the positional relations between the insertion hole $h_1$ and the sensor S, and $m_1$ to $m_4$ vectors representing the positional relations between the sensor S and each of the hands $H_1$ to $H_4$. By using these relative positions of FIG. 2, the movement of the circuit board B mounted with electronic parts in the sequence shown in FIG. 1 is illustrated by solid lines in FIG. 3 as a trace or the origin O. In FIG. 3, points $p_1$, $p_3$, $p_5$ designate the positions of the origin O with the insertion holes $h_1$, $h_2$, $h_3$ positioned to the sensor S respectively, and points $p_2$, $p_4$, $p_6$ the positions of the origin O with the insertion holes $h_1$, $h_2$, $h_3$ positioned to hands $H_1$, $H_2$, $H_3$, respectively. The explanation about the hand $H_4$ will be omitted.

In this conventional system, the disadvantage is a comparatively long time required for repeating the movement of the origin O of the circuit board B from the initial position $p_1$ to $p_2$ to $p_3$ to $p_4$ to $p_5$ to $p_6$ in the process of insertion of parts.

SUMMARY OF THE INVENTION

The object of the present invention is to provide a control system for an automatic electronic-part mounter which, obviating the disadvantages of the prior art, is capable of shortening the operation time by minimizing the distance covered by the circuit board in mounting a part.

In order to achieve this object, there is provided according to the present invention, "there is provided" a control system in which the positioning operation for correction of the displacement of the part mounting sections is performed separately from the subsequent operation of mounting electronic parts on the part-mounting sections, or specifically, the positioning processes are performed continuously for a predetermined number of part-mounting sections collectively, followed by collectively mounting the electronic parts on the part-mounting sections continuously.

One of the processes of mounting an electronic part is to insert a lead of the part into the insertion hole formed in a part-mounting section of the circuit board. The end of the lead inserted into the insertion hole is soldered in a subsequent process. Another process of mounting an electronic part is to set the part in contact with the adhesive arranged at the part-mounting section. In this case, the leads of the electronic part are placed in contact with the electrodes around the adhesive on the circuit board.

If a part-mounting section has one or a plurality of insertion holes, the position of the particular part-mounting section may be detected as to a specific one of the insertion holes. An optical sensor including a projector and a photo-detector is suited to the purpose of such position detection. However, a visual sensor is used if it is necessary to detect the position of each part-mounting section as to each of the electrodes included in a part-mounting section.

Data on the reference points of the part-mounting section on the circuit board are stored as a part of a program for controlling the automatic electronic part mounter to mount parts on the circuit board. The function of the sensor, therefore, is to supply data for correction of the position of each part-mounting section in accordance with the actual conditions of respective circuit boards.

BRIEF DESCRIPTION OF THE DRAWINGS

FIG. 4 and subsequent diagrams relate to embodiments of the present invention, in which:

FIG. 4 is a front view showing an automatic electronic part mounter;

FIG. 9 is a flowchart for the control system;

FIG. 10 is a plan view showing the movement of the circuit board with the operation of the control system; and FIGS. 11A and 11B are diagrams for explaining the time required for the operation.

DESCRIPTION OF THE PREFERRED EMBODIMENTS

Figure 4:
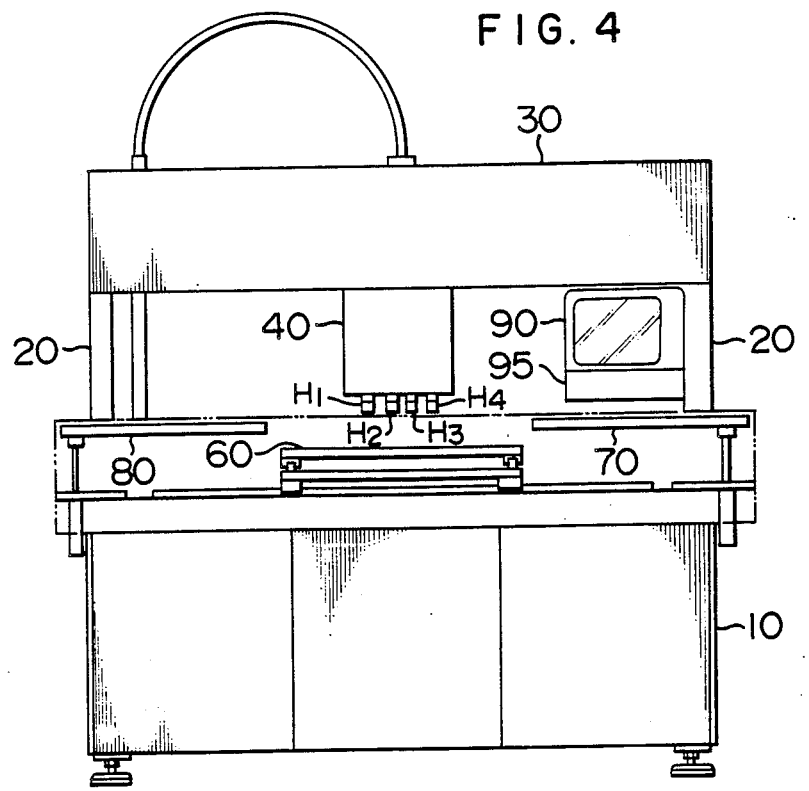
Figure 5:
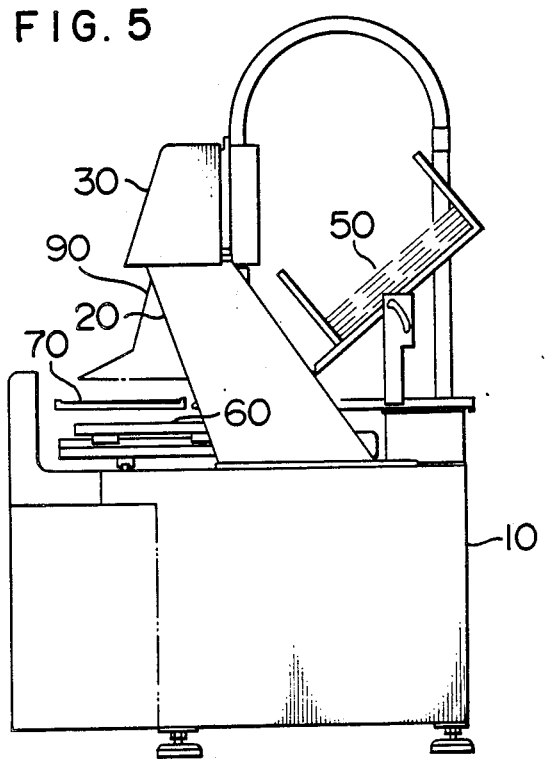
FIG. 5 is a side view thereof.

An embodiment of the present invention will be explained with reference to FIGS. 4 to 11. The automatic electronic-part mounter used in this embodiment is shown in FIGS. 4 and 5. The mounter according to this embodiment mounts an electronic part at a predetermined part-mounting section of a circuit board while at the same time inserting the lead of the electronic part into an insertion hole of the circuit board, and therefore is also called an automatic electronic part inserter.

In FIGS. 4 and 5, reference numeral 10 designates a frame, numeral 20 a couple of supports, numeral 30 a guide arranged between the supports 20, 20, and numeral 40 a hand unit movable longitudinally along the lower surface of the guide. The hand unit 40 is a kind of multihand having four hands $H_1$, $H_2$, $H_3$ and $H_4$. Numeral 50 designates a supply unit for various electronic parts utilizing an inclined stick for housing parts. The hands $H_1$ to $H_4$ inclined receive and hold the intended electronic parts at the delivery ports at the lower part of the supply unit 50. Numeral 60 designates a movable table which is carried along a horizontal surface with a circuit board not shown placed on the upper side thereof. Numeral 70 designates a subtable for delivering the circuit board inward, and numeral 80 a subtable for delivering the circuit board outward. The subtables 70, 80 may be lowered as required to a level flush with the movable table 60. Numeral 90 designates a display unit, and numeral 95 a keyboard. A control unit as shown in FIG. 6 required for control of the mounter is housed in the frame 10.

Figure 6:
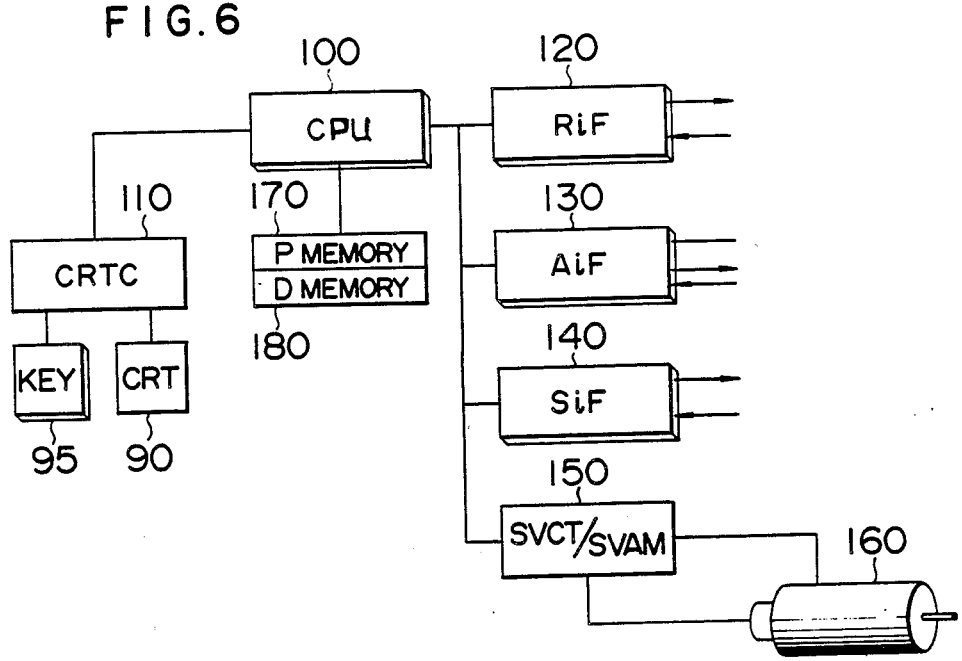
FIG. 6 is a block diagram showing a control system thereof.

In FIG. 6, numeral 100 designates a central processing unit which plays a major role in the control. Numeral 110 designates a controller such as a control unit for controlling the display unit 90 and the keyboard 95. Numeral 120 designates a relay interface connected to relays for controlling the vertical motion, inclination and opening/closing of the hands $H_1$ to $H_4$. Numeral 130 designates an interface for an auxiliary memory unit. Numeral 140 designates an interface for the sensor shown in FIG. 7. Numeral 150 designates a servo-controller and servo-amplifier for controlling various servo-motors by feedback. Numeral 170 designates a memory for storing a program, and numeral 180 a memory for storing data. The program formed in the memory 170 by use of the keyboard 95 or the display unit 90 is transferred to and stored in the auxiliary memory unit through the interface 130 whenever necessary.

Figure 7:
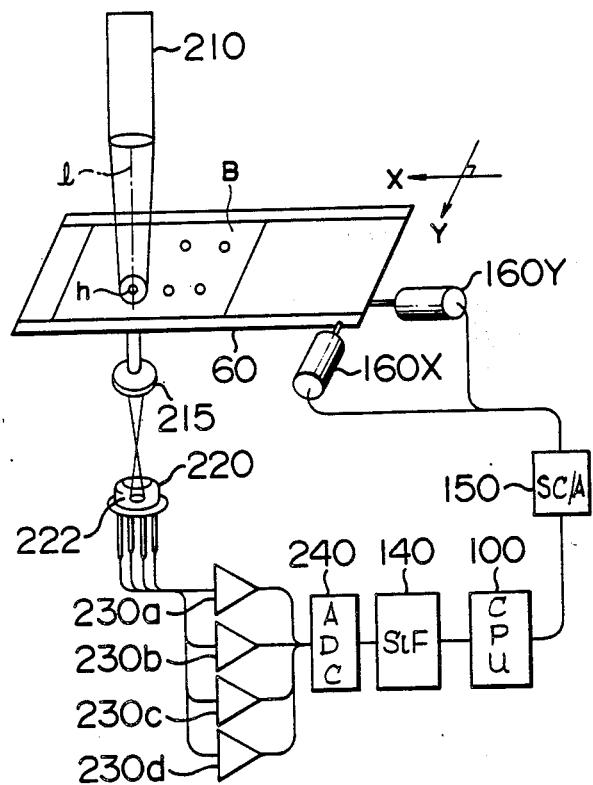
FIG. 7 is a diagram for explaining a sensor of the same mounter.
Figure 8:
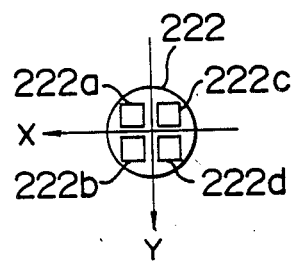
FIG. 8 is a plan view showing a photo-detector of the sensor.

The sensor will be explained with reference to FIGS. 7 and 8. This sensor is optical and includes a projector 210 and a photo-detector 220. Numeral 60 designates a movable table, and character B a circuit board placed in position by being carried on the movable table 60. Character h designates an insertion hole making up an object of position detection. Four light-receiving elements 222a, 222b, 222c and 222d are arranged on the light-receiving surface 222 of the photo-detector 220. Output signals of these elements are amplified by amplifiers 230a, 230b, 230c and 230d, and through an analog-digital converter 240 and through a sensor interface 140, are applied to the central processing unit 100. The sensor includes the projector 210 and the photo-detector 220 secured in position though not shown in FIGS. 4 and 5. The optical axis 1 between them, therefore, remains invariable. A specific insertion hole h of the circuit board B is set in position to coincide with the optical axis 1. This positioning process utilizes the data on the reference point about the insertion hole h. The positional error of the insertion hole h is computed in the central processing unit 100. The error along X axis relates to the output difference between the light-receiving elements 222a, 222b and the light-receiving elements 222c, 222d, while the error along Y axis to the output difference between the light-receiving elements 222a, 222c and the light-receiving elements 222b, 222d, thus making it possible to determine an error of the position of the insertion hole h. Actually, the servo motors 160X and 160Y for the movable table 60 are driven by use of the above-mentioned error data so that the position of the insertion hole h is rendered to coincide with the optical axis 1 thereby to balance the outputs of the light-receiving elements 222a, 222b, 222c and 222d. The output of the encoders of the servo motors 160X and 160Y associated with this situation are used to determine an amount of correction of the reference data about the insertion hole h. Data representing this amount of correction is stored in the data memory 180 shown in FIG. 6.

The operation of an embodiment of the present invention will now be explained with reference to the flowchart of FIG. 9. First, step 2-1 sets an insertion hole in position at the sensor, whereby the position is corrected against the particular insertion hole. Step 2-2 writes the corrected data in the memory 180. The operation of the steps 2-1 and 2-2 are performed continuously for a plurality of insertion holes by the decision of step 2-3, and repeated until a predetermined area of the data memory 180 is filled up.

When the answer at step 2-3 becomes thus affirmative, the process proceeds to step 2-4 for continuously repeating the insertion of electronic parts into corresponding insertion holes by use of the position data stored in the memory 180 in accordance with the decision at step 2-5.

Until step 2-6 decides that the entire program, that is, the program for all the insertion holes where parts are required to be inserted is executed completely, the process of continuous positional correction by steps 2-1, 2-2 and 2-3 and the process of continuous part insertion by steps 2-4 and 2-5 are repeated, thus completing the insertion of electronic parts into the circuit board B.

Figure 1:
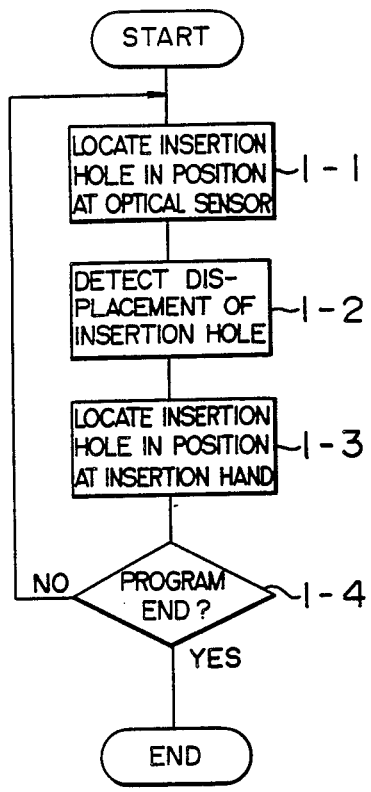
FIG. 1 is a flowchart showing a conventional control system for an automatic electronic part mounter.
Figure 3:
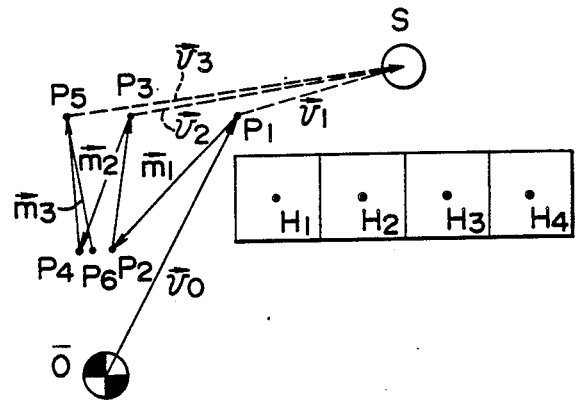
FIG. 3 is a plan view showing the movement of the circuit board with the operation of a conventional control system.
Figure 2:
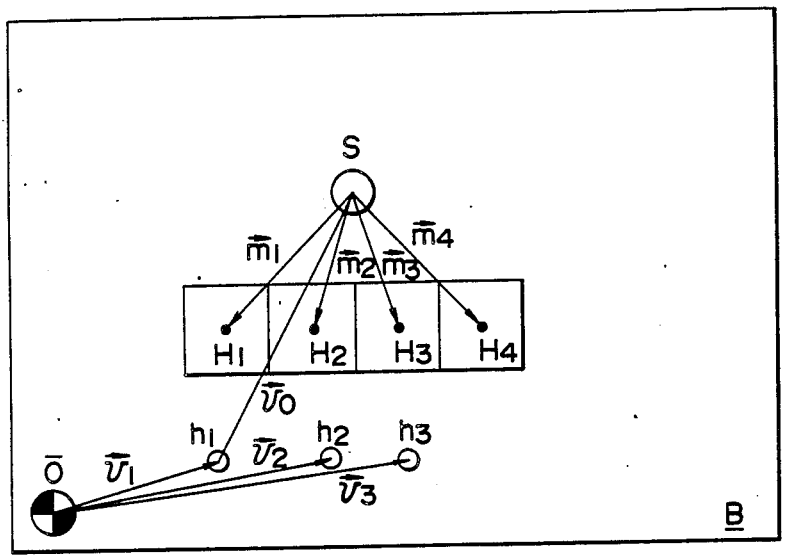
FIG. 2 is a plan view showing relative positions of insertion holes of the circuit board, a sensor and hands.

The motion of the circuit B with the part-inserting operation according to this embodiment is shown as a locus of the origin O by the solid line in FIG. 10. Comparison with the prior art of FIG. 3 shows that despite the same number of passes, the total distance covered is considerably smaller in the embodiment of FIG. 10 than in the prior art system. Specifically, in an ordinary circuit board B, the distance between the part insertion holes $h_1$, $h_2$ and $h_3$ is not so great as between the sensor S and a hand H. In the case of FIG. 10, the origin O moves from the sensor S to the hand H only by an amount represented by the vector $m_5$, with the result that the distance covered by the circuit board B is greatly reduced or almost by half as compared with the prior system shown in FIG. 3.

In the embodiment under consideration which uses a plurality of hands for a single sensor S of an automatic electronic part mounter, the distance between the hand and the sensor is greater, resulting in a further reduced distance covered by the circuit board B.

The operation of such an automatic electronic part mounter as described above includes not only the process of inserting an electronic part by a hand but also the process of taking the electronic part from the part supply unit 50. The latter process of taking an electronic part from the supply unit consumes a considerable time as compared with the part inserting process.

Let a be the time required for taking an electronic part by hand, b the time required for correcting the displacement of an insertion hole, and c the time required for inserting each part. Assuming that there are four part insertion holes, the relationship between the time a, b and c in this embodiment is given in FIG. 11A. In the beginning of operation, the processes relating to time a and b start, and until these processes relating to time a and b are complete, the process relating to time c cannot be started.

According to this embodiment of the invention, if the total time of four operations b is shorter than the operation time a, the time required for part insertion is $(a+c \times 4)$ as shown in FIG. 11A.

Corresponding processes of the conventional system explained with reference to FIG. 3 are shown in FIG. 11B. In view of the fact that the process relating to time c cannot be performed before the completion of the process relating to time a, and that the process relating to time b is required to be always followed by the process relating to time c in the prior art system, it is necessary to wait for the lapse of time a after one process relating to time b until the process relating to time a is completed.

In this conventional system, therefore, the time length expressed by $(a+c \times 4+b \times 3)$ as shown is required for the part-inserting operation. Thus the processing time according to the present invention shown in FIG. 11A is shorter than that for the conventional system.

It will thus be understood from the foregoing description that according to the present invention, the processes of correcting the positions of a predetermined number of part insertion holes and inserting electronic parts into them are performed collectively and continuously, and the distance to be covered by the circuit board before complete part insertion is greatly reduced while at the same time making possible parallel operations of holding a part by hand and correcting the position of a part insertion hole, thereby sufficiently shortening the time required for part insertion by obviating the shortcomings of the prior art.

Consequently, even when the position of a part insertion hole is corrected by a position-detecting sensor, it does not take a long time to insert a part, and therefore the sensor can be used within a restricted time of work, thus providing an automatic electronic part inserter which is always capable of performing the part-inserting operation easily and accurately.

I claim:

1. In an automatic electronic part mounter using a sensor for detecting the position of part-mounting sections on a circuit board, the improvement comprising memory means for storing data for correction of the part-mounting section positions, produced by said sensor, wherein, a process of obtaining said data for subsequent process of mounting the part are each separately performed collectively and continuously for a predetermined number of part-mounting sections.

2. An automatic electronic part mounter according to claim 1, further comprising a, multi-hand unit having a plurality of part-mounting hands.

3. An automatic electronic part mounter according to claim 1, wherein said sensor is a photoelectric position detector of quarter detection type.

4. An automatic electronic part mounter comprising:
   means for sequentially detecting data for correcting information about positions of several part-mounting sections;
   memory means for storing said data for correction of the part-mounting section positions;
   means for mounting parts at said positions;
   means for sequentially moving said mounting means on the basis of said data and thereby loading parts at several part-mounting sections;
   wherein a process of obtaining said data for correcting the positions of the part-mounting sections and a subsequent process of mounting the parts are each separately performed collectively and continuously for a predetermined number of part-mounting sections.

5. An automatic electronic part mounter according to claim 4 wherein said mounting means comprises a multi-hand unit having a plurality of part-mounting hands.

6. An automatic electronic part mounter according to claim 4, wherein said detecting means is a photoelectric position detector of quarter detection type.

7. An automatic electronic part mounter, comprising:
   sensor means for producing data representative of the positions of several part-mounting sections on a circuit board;
   means for moving a circuit board within a single plane, relative to said sensor means;
   means for mounting parts at said positions;
   processing means for controlling said moving means to sequentially affect production of said data, for deriving information about said positions from said data and for controlling said mounting means to sequentially move said mounting means to several part-mounting sections on the basis of said information, and thereby sequentially mounting parts at the several part-mounting sections; and memory means for storing said information.

8. An automatic electronic part mounter according to claim 7 wherein said mounting means comprises a multi-hand unit having a plurality of part-mounting hands.

9. An automatic electronic part mounter according to claim 7, wherein said sensor means is a photoelectric position detector of quarter detection type.

10. An automatic electronic part mounter, comprising:

means for continuously producing data about positions of several part-mounting sections on a circuit board;

means for continuously mounting parts at said positions;

memory means having a finite capacity, for storing information about said positions; and processing means for providing corrected information about said positions by modifying predetermined information about said positions on the basis of said data, for controlling said data producing means to sequentially obtain said data and writing said corrected information into said memory means until said finite capacity of said memory means is filled, and for controlling said mounting means to sequentially move said mounting means to each of said positions on the basis of said corrected information and thereby mounting parts at the several part-mounting locations.

11. An automatic electronic part mounter according to claim 10, wherein said mounting means comprises a multi-hand unit having a plurality of part-mounting hands.

12. An automatic electronic part mounter according to claim 10, wherein said data producing means includes a photoelectric position detector of quarter detection type.

13. An automatic electronic part mounter, comprising:

means for continuously producing data about positions of several part-mounting sections on a circuit board;

means for continuously mounting parts at said positions;

memory means for storing information about said positions; and processing means for providing corrected information about said positions by correcting predetermined information about said positions on the basis of said data, for controlling said data producing means to sequentially obtain said data and writing said corrected information into said memory means until data about all of said positions has been produced, and for controlling said mounting means to sequentially move said mounting means to each of said positions on the basis of said corrected information, and thereby mounting parts at the several part-mounting locations.

14. An automatic electronic part mounter according to claim 13, wherein said mounting means comprises a multi-hand unit having a plurality of part-mounting hands.

15. An automatic electronic part mounter according to claim 13, wherein said data producing means includes a photoelectric position detector of quarter detection type.

16. A process for automatically mounting electronic parts, comprising, in sequence:

continuously locating a plurality of positions of part-mounting sections on a circuit board;

producing data about said positions;

correcting predetermined information according to said data, to provide corrected information; and storing said corrected information in a memory until the capacity of said memory has been filled; and continuously mounting parts at said part-mounting sections on the basis of said corrected information, until parts have been mounted on the basis of each item of said corrected information stored in said memory.

17. The process of claim 16, wherein said plurality of positions are located sequentially in a series of operations performed separately from the steps of continuously mounting parts at said part mounting sections.

18. The process of claim 16, wherein said plurality of positions are located for a predetermined number of part-mounting sections collectively, and then said parts are collectively mounted at said part-mounting sections on the basis of said corrected information.

19. A process for automatically mounting electronic parts, comprising, in sequence:

performing a first sequence by continuously:

locating positions of a plurality of part-mounting sections on a circuit board;

producing data about said positions;

correcting predetermined information according to said data, to provide corrected information; and storing said corrected information in a memory;

until the capacity of said memory has been filled; and performing a second sequence by continuously mounting parts at said part-mounting sections on the basis of said corrected information, until parts have been mounted on the basis of each item of said corrected information stored in said memory.

20. The process of claim 19, wherein said plurality of positions are located sequentially in a series of operations performed separately from the steps of continuously mounting parts at said part mounting sections.

21. The process of claim 19, wherein said plurality of positions are located for a predetermined number of part-mounting sections collectively, and then said parts are collectively mounted at said part-mounting sections on the basis of said corrected information.

22. A process for automatically mounting electronic parts, comprising in sequence:

performing a first sequence by continuously:

locating positions of a plurality of part-mounting sections on a circuit board;

producing data about said positions;

correcting predetermined information according to said data, to provide corrected information; and storing said corrected information in a memory;

until the capacity of said memory has been filled; and performing a second sequence by continuously mounting parts, in order, at said part-mounting sections on the basis of said corrected information, until all of a plurality of parts have been mounted at said part-mounting sections.

23. The process of claim 22, wherein said plurality of positions are located sequentially in a series of operations performed separately from the steps of continuously mounting parts at said part mounting sections.

24. The process of claim 22, wherein said plurality of positions are located for a predetermined number of part-mounting sections collectively, and then said parts are collectively mounted at said part-mounting sections on the basis of said corrected information.

* * * * *